Oct. 5, 1937.  J. A. CLINTON  2,095,027
ELECTRIC METER SERVICE INSTALLATION
Filed Nov. 2, 1935  2 Sheets-Sheet 1
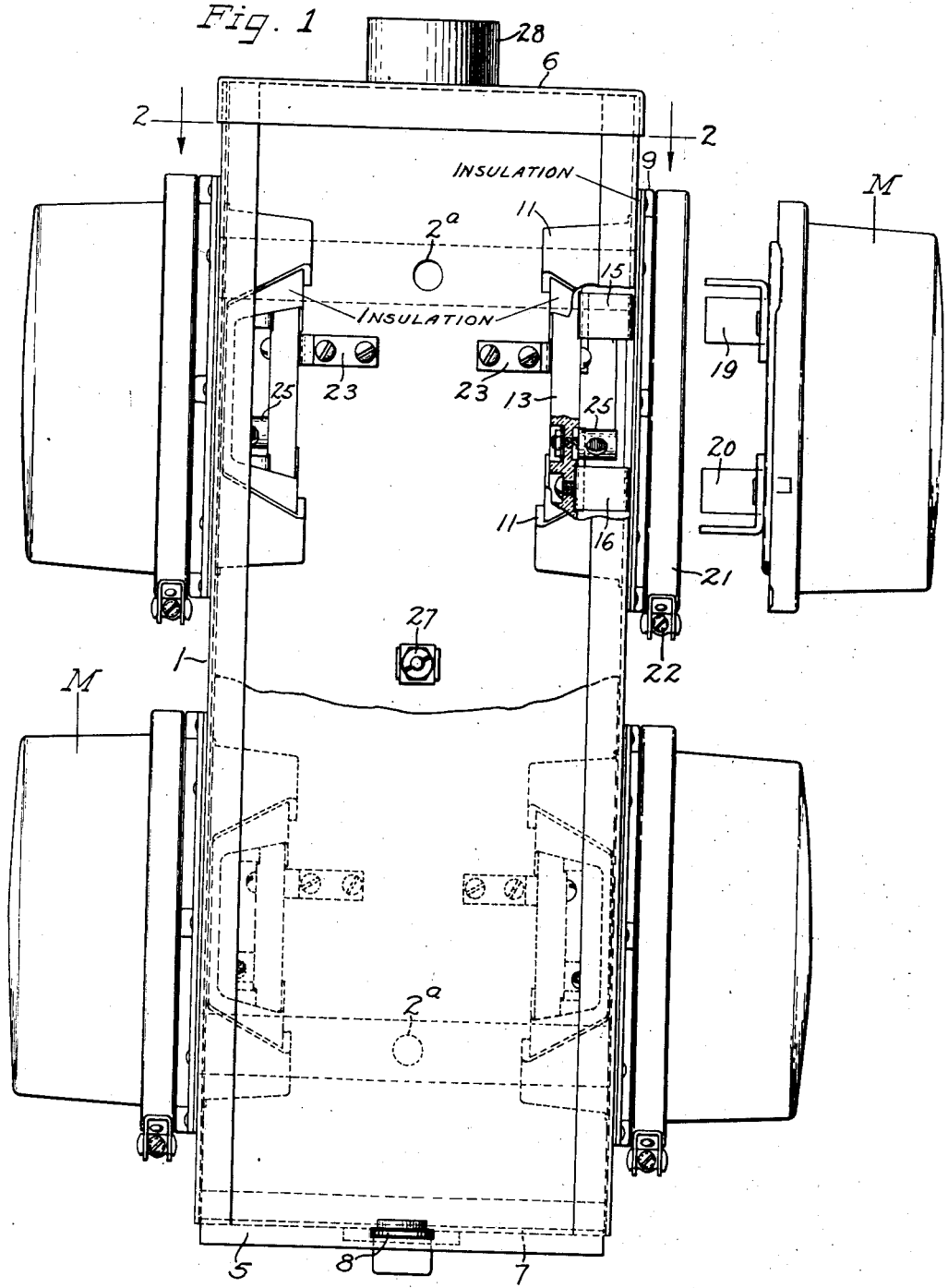
Inventor
Joseph A. Clinton
By S. Jay Teller
Attorney Oct. 5, 1937.   J. A. CLINTON   2,095,027
ELECTRIC METER SERVICE INSTALLATION
Filed Nov. 2, 1935   2 Sheets-Sheet 2
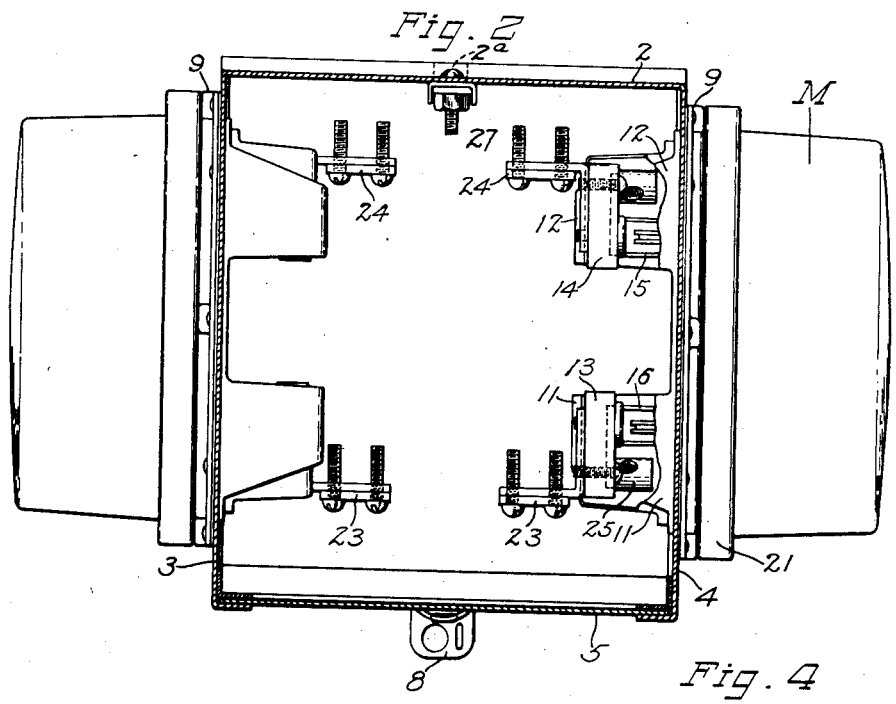
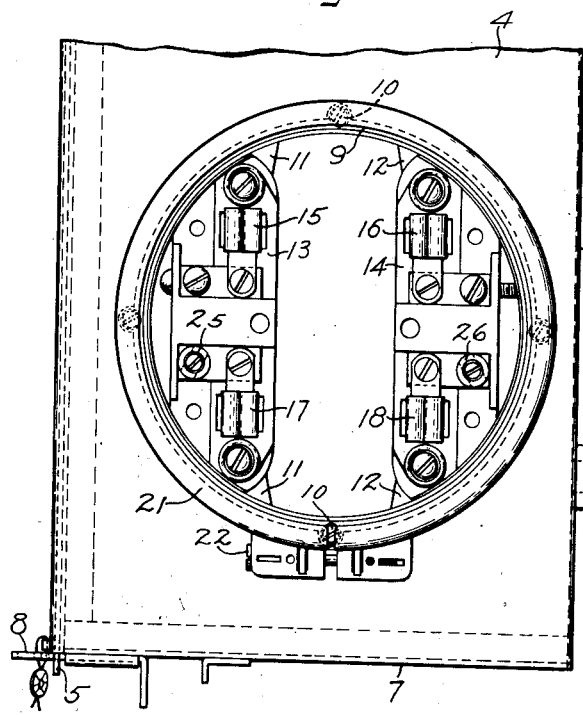
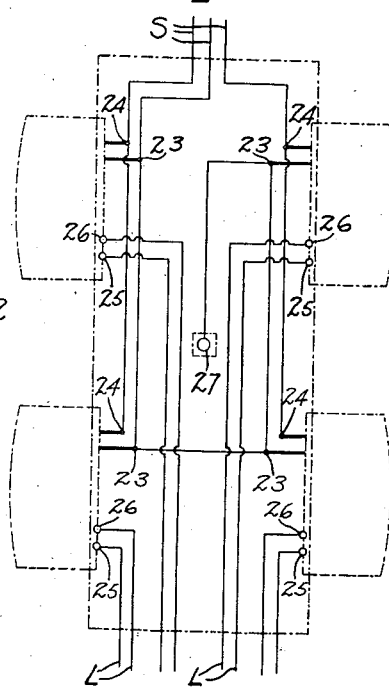
Inventor
Joseph A. Clinton
By S. Jay Teller
Attorney Patented Oct. 5, 1937

2,095,027

UNITED STATES PATENT OFFICE 2,095,027

ELECTRIC METER SERVICE INSTALLATION

Joseph A. Clinton, Rocky Hill, Conn., assignor to Colt's Patent Fire Arms Manufacturing Co., Hartford, Conn., a corporation of Connecticut Application November 2, 1935, Serial No. 48,029

4 Claims. (Cl. 247—2)

The present invention relates particularly to an electric meter service installation comprising a box or trough adapted for containing service and load wires and having two or more meters protectively associated therewith and connected with the said wires.

The principal object of the invention is to provide an installation of the character described wherein the meters are so arranged with respect to the box or trough that a considerable economy of space and material is effected, particularly with respect to the longitudinal dimensions. In accordance with the present invention the meters, instead of being all associated with a single wall of the trough or box, are associated with at least two different walls so as to conserve length.

Another object is to provide an installation of the type above mentioned wherein the meters are readily detachable both electrically and mechanically from the box.

A further object of the invention is to so arrange the parts of an electrical meter installation that free access may be had to the electrical connections.

In the accompanying drawings I have shown one representative embodiment of the invention, but it will be understood that the drawings are intended for illustrative purposes only and are not to be construed as defining or limiting the scope of the invention, the claims forming a part of this specification being relied upon for that purpose.

Of the drawings:

Fig. 1 is a front view of a meter service installation embodying the invention, the upper part of the cover being broken away to show interior parts.

Fig. 2 is a horizontal sectional view taken along the line 2—2 of Fig. 1.

Fig. 3 is a fragmentary side view with the corresponding meter removed so as to show the meter connecting appliance.

Fig 4 is a diagrammatic view showing a representative arrangement of wiring connections.

Referring to the drawings, I represents as an entirety a box or trough adapted for containing service and load wires and provided with longitudinal walls having their outer surfaces facing in different directions. Preferably and as shown, the trough I is rectangular in transverse section, being provided with a rear wall 2, with side walls 3 and 4, and with an openable front cover 5. The walls 2, 3, and 4 have been termed longitudinal walls and this terminology is used herein to designate any walls connecting the end walls, irrespective of relative dimensions. The trough may be closed at the ends by walls 6 and 7, which are shown as being permanently held in place, although this is not essential.

The trough may be constructed for mounting in different positions, but preferably the trough is mounted vertically, as indicated in Fig. 1. Holes 2ª may be provided in the rear wall to facilitate the mounting of the trough on a suitable support.

At least one of the walls of the trough is formed and adapted for the protective association therewith of an electric meter, and in the particular embodiment shown two walls are so formed. While I do not necessarily so limit myself, I prefer to associate the meters with two opposite walls such as the walls 3 and 4. As shown, the cover 5 is mounted to slide vertically in guides carried at the front edges of the walls 3 and 4. The cover 5 is normally held in its upper closed position by means of a latch 8 slidably mounted in a suitable guide on the bottom wall normally projecting through an opening near the lower edge of the cover.

The electric meters used with the installation to which the invention relates are associated with the differently facing longitudinal walls such as 3 and 4 in such a manner that access cannot be had to the meter terminals or to any conducting parts so long as the meters are in their normal relationship with the said walls. Preferably there is provided in conjunction with each meter a suitable meter connection or mounting appliance to which the service and load wires are connected and to which the meter is electrically connected in such a way as to complete the necessary circuits therethrough.

While I do not necessarily so limit myself, I have shown each meter connection appliance as being of a well-known type which is adapted to be mounted at an opening in the trough wall and to detachably support a meter especially designed for that purpose. The appliance as illustrated serves not only for establishing the necessary electrical and mechanical connections but also serves, in cooperation with the meter itself, to provide the necessary protective relationship and to prevent access to any conducting parts so long as the meter remains in place.

The invention is not limited with respect to the number of meters and meter connection appliances. However, I have shown an installation wherein there are four meter connection appliances and meters, two associated with each of the opposite vertical walls 3 and 4. Inasmuch as the meter connection appliances are similar to each other, a description of one of them will serve for all.

Each meter connection appliance as shown comprises a metallic ring 9 which is mounted at openings in the corresponding trough wall and held in place by screws 10, 10. Carried by the ring are inward projections 11 and 12 which serve to support insulating blocks 13 and 14, the latter being positioned within the trough. The insulating blocks 13 and 14 carry sockets or clips 15, 16 and 17, 18 adapted to mechanically engage and provide electrical connection with conductor blades 19 and 20 projecting rearward from the meter M. When the blades 19 and 20 of the meter have been fully engaged with the clips 15, 16 and 17, 18 of the connection appliance, the meter may be locked or clamped to the ring 9 by means of a suitable split clamping ring 21. The end portions of the ring 21 may be drawn together by means of a screw 22 and may be suitably locked or sealed.

Electrically connected with the clips 15 and 16 are wire terminals 23 and 24 which project into the interior of the trough so as to be conveniently available for connection with service wires. Electrically connected with the clips 17 and 18 are wire terminals 25 and 26 adapted for the connection of load wires. The load wires may extend through the space between the two insulating blocks 13 and 14 and thence into engagement with the terminals 25 and 26.

A suitable neutral terminal 27 is preferably provided, this being grounded to a wall of the trough, as for instance the rear wall.

The actual wiring connections may be varied widely according to the particular wiring system that may be preferred and according to the number of meters to be connected. In Fig. 4, I have shown one suitable wiring arrangement, but it will be understood that this is intended merely to be representative and that several other different wiring arrangements may be used as preferred. As shown, one of the service wires S is connected with the terminals 24, 24 of the connection appliances at the left. Another of the service wires S is connected with the terminals 24, 24 of the connection appliances at the right. The third or neutral service wire S is connected with the remaining terminals 23, 23 of all four meters and is also connected with the neutral terminal 27. Four sets of load wires L, L are provided in association with the four meters, the wires of each set being connected to the corresponding terminals 25 and 26 of the meter connection appliances.

As shown, the service wires are brought into the box or trough through a suitable conduit such as 28 connected with the top wall and the several sets of load wires are led out at the bottom, as for instance through suitable conduits (not shown) connected with knock-out holes in the bottom wall. However, the invention is not limited to any particular arrangement or positioning of the service and load wires.

From the foregoing description it will be apparent that by my present invention I have provided an electric meter service installation of the trough type wherein the trough is very much shorter than would otherwise be necessary to accommodate the same number of meters. By arranging the meters in association with different walls of the trough, preferably opposite walls, the same wiring space within the trough is utilized for at least two sets of meters, and inasmuch as two different walls of the trough are used for meter protection and association, the length of the trough is correspondingly reduced. By reason of the openable cover it is possible to obtain access to the wiring space and the wires without in any way disturbing the meters or the connection appliances with which they are associated.

As already stated, I do not limit myself to any particular positioning of the installation, but it is particularly adapted to be mounted in a vertical position, as shown. It may be mounted on an interior or exterior building wall, or it may be mounted on a pole or any other suitable support.

What I claim is:

1. An electric meter installation comprising in combination, a rectangular box adapted to contain service and load wires and having meter receiving openings in at least two longitudinal walls, an openable cover of substantial size for said box in addition to the said two longitudinal walls affording free access to the interior of the box when the cover is open, and meters positioned at said openings with their terminal portions extending into the box.

2. For an electric meter installation, a box adapted to contain service and load wires and having two opposite walls provided with openings, an openable front cover on said box in addition to the said two opposite walls, and meter mounting appliances supported by said walls in the openings and having electrical connections within the box which are readily accessible when the cover is open and to which the service and load wires may be connected.

3. For an electric meter installation, a box adapted to contain service and load wires and having two opposite walls provided with openings, an openable front cover on said box in addition to the said two opposite walls, and meter mounting appliances supported by said walls in the openings and substantially closing the same and having electrical connections within the box which are readily accessible when the cover is open and to which the service and load wires may be connected.

4. For an electric meter installation, a box adapted to contain service and load wires and having two opposite walls provided with openings, an openable front cover on said box in addition to the said two opposite walls, and meter mounting appliances supported by said walls in the openings and having electrical connections within the box to which the service and load wires may be readily connected when the cover is open and to which meters may be detachably connected and having means positioned externally of the box to which the meters may be detachably mechanically connected.

JOSEPH A. CLINTON.